April 14, 1936. W. C. WHALEY 2,037,054
ROTARY DRIVING CONNECTION
Filed Jan. 2, 1935 2 Sheets-Sheet 1
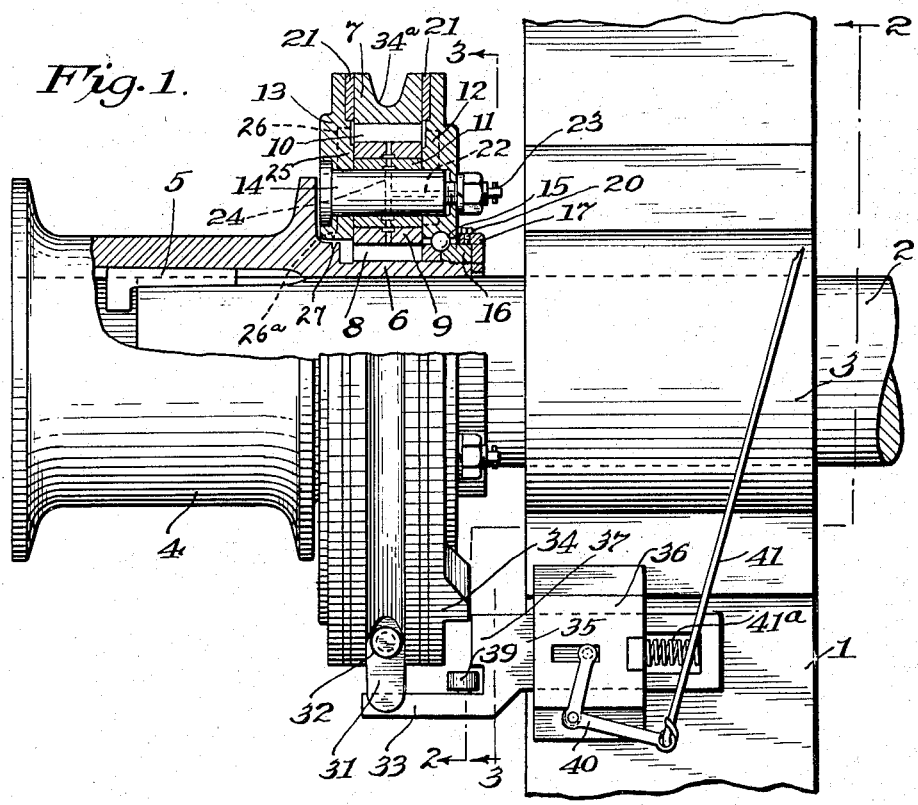
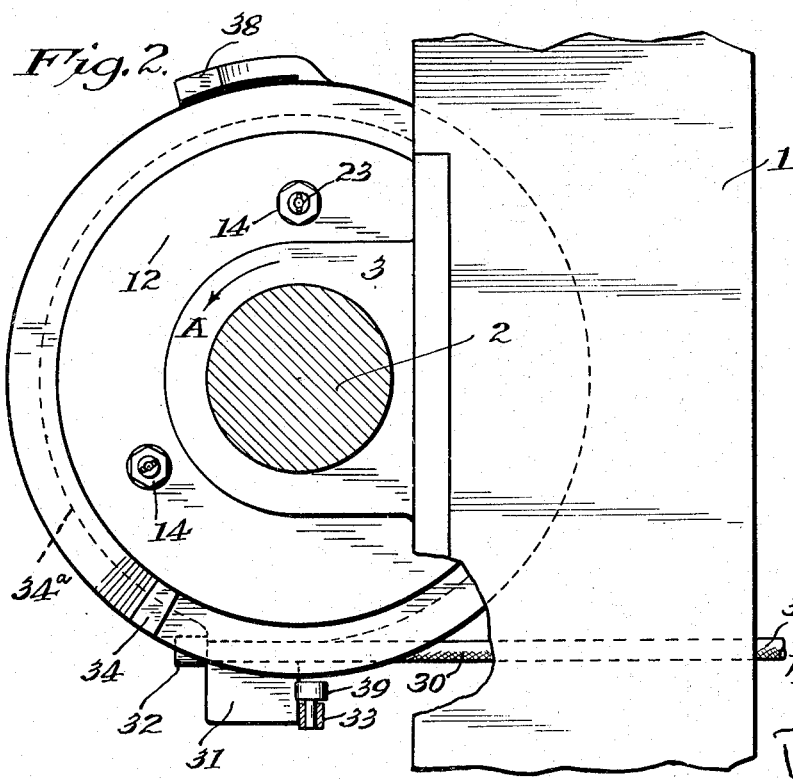
INVENTOR.
*William C. Whaley,*
*R. W. Smith*
ATTORNEY.

April 14, 1936.  W. C. WHALEY  2,037,054
ROTARY DRIVING CONNECTION
Filed Jan. 2, 1935  2 Sheets-Sheet 2
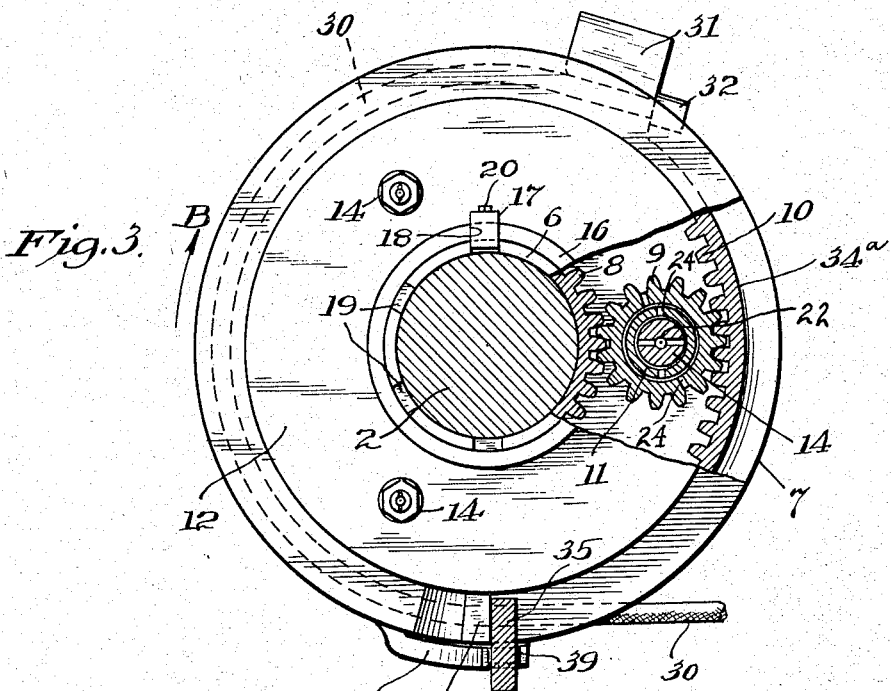
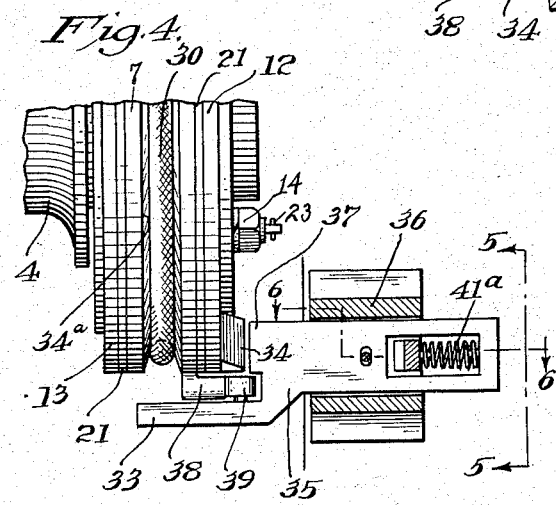
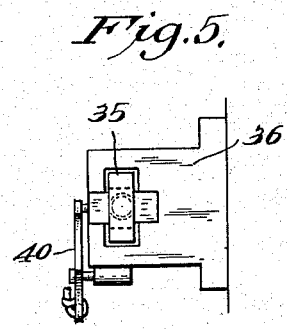
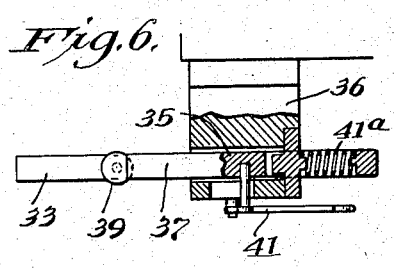
INVENTOR.
William C. Whaley,
BY
ATTORNEY.

UNITED STATES PATENT OFFICE 2,037,054

ROTARY DRIVING CONNECTION

William C. Whaley, Los Angeles, Calif.

Application January 2, 1935, Serial No. 19

12 Claims. (Cl. 254—173)

This invention is a rotary driving connection particularly applicable for operating tongs for breaking joints of drill pipe and the like, and has for its object to provide a simplified and practical device, particularly adapted for mounting on and operation by the usual line shaft of a draw works of a rotary drilling rig.

It is a further object of the invention to provide a steady and powerful pull by winding the tong line around a sheave which is rotated by the line shaft through a speed reduction driving connection.

It is a still further object of the invention to normally render the driving connection inoperative so that the sheave remains stationary when not in use, and to readily engage the driving connection for rotating the sheave, and automatically disengage the driving connection when the tong line has been wound around the rotating sheave for exerting the desired pull, with the sheave adapted for return to normal stationary position when the driving connection has been disengaged, so as to unwind the tong line ready for reuse.

It is a still further object of the invention to preferably incorporate the tong operating device and a usual cathead in a unitary structure adapted for mounting on the line shaft of a draw works, with the cathead at the end of the line shaft and adapted for normal use without interference by the tong operating device, and with the tong operating device of compact construction and presenting no obstruction to free movement of workmen around the draw works and having no projecting parts such as might cause injury to careless workmen.

It is a still further object of the invention to provide a driving connection between the line shaft and the rotatable sheave, comprising planetary gearing having pinions meshing with an external gear on the line shaft and with a ring gear in the bore of the sheave, the pinions being adapted for rotation relative to their axes and being also adapted for revolution around the common axis of the line shaft and the rotatable sheave, so that with the pinions free to revolve as well as rotate, the sheave may be held stationary with the tong line unwound and ready for use, the pinions merely forming idlers; but by holding the pinions against revolution, their continued rotation on their own axes provides reduction gearing whereby the line shaft turns the sheave at reduced speed for winding the tong line around the sheave.

It is a still further object of the invention to provide means, preferably manually actuated, for holding the pinions against revolution so as to rotate the sheave for pulling the tong line, and to also provide means for automatically disengaging the holding means when the sheave has been rotated to a position when the desired pull has been exerted on the tong line.

It is a still further object of the invention to provide a rotary driving connection including planetary gearing between a drive element and a driven element, with releasable holding means for rendering the planetary gearing operative to rotate the driven element by the drive element, and with the holding means preferably adapted for release responsive to rotation of the driven element.

Further objects of the invention will be readily understood from the following description of the accompanying drawings, in which Fig. 1 is a fragmentary rear elevation of the line shaft of a draw works, showing the tong operating device partly in axial section and in normal inoperative position.

Fig. 2 is a transverse section on the line 2—2 of Fig. 1.

Fig. 3 is a transverse section on the line 3—3 of Fig. 1, with the sheave rotated to exert the desired pull on the tong line.

Fig. 4 is a fragmentary front elevation of the tong operating device, with the parts in the position shown at Fig. 3.

Fig. 5 is a vertical section on the line 5—5 of Fig. 4.

Fig. 6 is a horizontal section on the line 6—6 of Fig. 4.

The invention is particularly adapted for embodiment in a tong operating device which is mounted on the line shaft of a draw works, and at Fig. 1 I have shown a part of one of the usual uprights 1 of a draw works, with the usual transverse line shaft 2 journaled thereon at bearing 3. The end of the line shaft which projects outwardly beyond upright 1 is adapted to receive a usual cathead 4, and the tong operating device is preferably mounted on the line shaft between the cathead and the upright of the draw works, with the cathead and the tong operating device preferably comprising a unitary assembly. As an instance of this arrangement the cathead 4, which is fixed for rotation with line shaft 2, as for example by a key 5, has a longitudinally projecting sleeve 6 at its inner end and the elements constituting the tong operating device are preferably mounted on this sleeve.

The tong operating device comprises a planetary gear driving connection between the shaft 2 and a sheave on which the tong operating line is adapted to be wound. The driving connection includes a drive gear, a support for a pinion and a second gear, with the pinion meshing with the gears, and with the support and the second gear adapted for rotation relative to the drive gear and comprising relatively rotatable elements, one of which forms the sheave for the tong line. In the illustrated embodiment of the invention the planetary driving connection includes an external gear 8 on the sleeve 6, meshing with pinions 9 which in turn mesh with an internal ring gear 10 in the bore of a sheave 7. The pinions are adapted for rotation relative to their respective axes and are also adapted to revolve around the axis of shaft 2. As an instance of this arrangement the pinions may be journaled on bushings 11 which are supported between annular end plates 12—13 which overlie the ends of gearing 8—9—10 and which are adapted to revolve on sleeve 6, the parts being held in assembled relation by bolts 14 which extend through the bushings and the end plates, thereby forming a pinion supporting unit which is adapted for revolution around the axis of shaft 2.

An anti-friction bearing is preferably provided between the sleeve 6 and this pinion supporting unit, and is shown as comprising ball bearings 15 mounted in a ball race 16 between the sleeve 6 and one of the end supporting plates, preferably the inner plate 12, with the ball race 16 preferably threaded onto the sleeve 6, and held in place by suitable locking means. The locking means may comprise a clip 17 adapted to seat in a notch 18 in the end of ball race 16 and also adapted to seat in any one of a plurality of notches 19 which are cut in the end of sleeve 6, the clip being held in locking position by a screw 20 which is threaded through the clip and into the ball race. Wear resisting means are preferably provided between the end plates 12—13 and the rotatable sheave 7, and are shown as wear plates 21 mounted in the inner faces of the end supporting plates so as to bear against the ends of the sheave.

The planetary gearing may be lubricated via bores 22 in the bolts 14, which at their outer ends may be provided with usual connections 23 for supplying a lubricant under pressure, and which at their inner ends communicate with radial bores 24 which discharge the lubricant at the teeth of pinions 9. The inner faces of the end supporting plates 12—13 may have bosses 25 surrounding the bolts 14 and bearing against bushings 11, so that except at said bosses the inner faces of the supporting plates form clearance spaces 26 at the ends of gearing 8—9—10, whereby the lubricant is free to flow radially outwardly to be trapped by the snugly fitting wear plates 21, rather than leaking out at the inner peripheries of the annular plates 12—13. To further avoid leakage, the sleeve 6 preferably has a groove 27 adapted to trap the lubricant and having an inclined side wall for directing the lubricant radially outwardly and against a flaring lip 26a of the clearance space 26 which is formed at the inner face of the outer supporting plate 13.

A usual tong operating cable 30 is connected to sheave 7, as for example by extending the end of the cable through a lug 31 which projects from the periphery of the sheave, with an abutment 32 at the end of the cable engaging the lug; and the pinion supporting unit 12—13 is normally free to revolve around the axis of shaft 2, so that rotation of the shaft, which is in the direction of arrow A, turns sheave 7 in the same direction, due to the friction of the gearing 8—9—10 holding the pinions 9 against rotation relative to their axes, so that the entire gearing revolves as a unit around the axis of shaft 2. The cable 30 is thus completely unwound from the sheave so that the cable projects forwardly from the sheave at lower dead center, ready for the cable to be connected to tongs, in which position rotation of the sheave is arrested by its lug 31 engaging a stop 33 as shown at Fig. 2. This engagement renders inoperative the driving connection between shaft 2 and sheave 7, since with the sheave 7 held against rotation, the gear 8 will rotate the pinions 9 on their axes while the pinion supporting unit 12—13 continues to revolve. The pinions 9 thus become merely idlers transmitting no rotary motion to the sheave 7. With the sheave thus held stationary in normal position, the forwardly projecting cable 30 is connected to the tongs which are to be operated, and the pinion supporting unit 12—13 is then held against rotation, whereupon the gear 8 rotates the pinions 9 relative to their axes, without the pinions revolving around the axis of shaft 2, and the sheave 7 is thereby rotated in the reverse direction to that of shaft 2, as shown by arrow B at Fig. 3. The cable is thus wound around the sheave, being received in a groove 34 in the periphery of the sheave. When the sheave has been turned such distance as to wind the required length of cable for exerting the desired pull, as for example to the position shown at Fig. 3, the pinion supporting unit 12—13 is automatically released so that it is again free to revolve around the axis of shaft 2. The friction of gearing 8—9—10 will thus again hold the pinions 9 against rotation relative to their axes so that the entire gearing revolves in the direction of arrow A, thereby unwinding the cable and again arresting the sheave in normal position when its lug 31 reengages the stop 33. The cable is thus held in normal stationary position, ready to exert a pull on the tongs, when the pinion supporting unit is again held against revolution around the shaft 2.

The means for holding the pinion supporting unit against revolution, and then releasing it when the sheave 7 has been turned to the position shown at Fig. 3, comprises an abutment 34 on the plate 12, adapted to cooperate with a latch 35 which may be projected to engage the abutment and hold the pinion supporting unit stationary, and which is automatically retracted to release the pinion supporting unit when the sheave 7 has been turned to exert the desired pull.

As an instance of this arrangement the latch may be slidably mounted in a bracket 36 on upright 1, and when the latch is projected to operative position an abutment 37 of the latch is in the path of travel of the abutment 34, so that as the pinion supporting unit revolves, its abutment 34 will engage the abutment 37 for arresting revolution of the pinion support, thereby turning the sheave 7 in the direction of arrow B as previously described, and when the sheave 7 has been turned to the position shown at Fig. 3, a cam 38 on the side of the sheave engages a roller 39 on the operatively projected latch, for retracting the latch so as to disengage the abutments 34—37. The pinion supporting unit is thus released for revolution around the shaft 2, so that the sheave 7 is automatically returned to normal inoperative position as previously described.

The latch 35 is normally retracted and is adapted for manual projection to operative position, and is then automatically held in operative position until retracted by the cam 38. As an instance of this arrangement one arm of a bell crank lever 40 may engage the latch, with an operating line 41 connected to the other arm of the lever and extending to any convenient point on the draw works. A pull on the line swings the bell crank lever so as to project the latch, preferably against the tension of a spring 41a, and when the abutments 34—37 have engaged, the tendency of the pinion supporting unit 12—13 to revolve insures such frictional engagement at the cooperating abutments as to prevent the spring 41a disengaging the abutments. Consequently the control line 41 may be released immediately after engagements of the abutments 34—37, with the holding means remaining operative until the cam 38 exerts such pressure against the latch as to retract the same by overcoming the frictional resistance at the cooperating abutments. The spring 41a then holds the latch in retracted position until the device is again operated by pulling on line 41.

I claim:

1. In combination, a drive gear, a support rotatable concentric with the gear, a pinion on the support meshing with the gear and adapted for rotation relative to the axis of the pinion, the pinion being adapted for revolution around the axis of the drive gear by rotation of the support, a driven gear meshing with the pinion and rotatable concentric with the drive gear, means for releasably holding the support stationary so as to prevent revolution of the pinion and thereby rotate the driven gear by rotation of the pinion, and means actuated by rotation of the driven gear for releasing the holding means.

2. In combination, a drive gear, a support rotatable concentric with the gear, a pinion on the support meshing with the gear and adapted for rotation relative to the axis of the pinion, the pinion being adapted for revolution around the axis of the drive gear by rotation of the support, a driven gear meshing with the pinion and rotatable concentric with the drive gear, means for holding the support stationary so as to prevent revolution of the pinion and thereby rotate the driven gear by rotation of the pinion and in the opposite direction to that of the drive gear, means for releasing the holding means, the gearing frictionally holding the pinion against rotation relative to its axis when the holding means is released, whereby the driven gear is rotated in the same direction as that of the drive gear by revolution of the pinion, and an abutment adapted for engagement by the driven gear for arresting its rotation after predetermined turning in said last mentioned direction.

3. In combination, a drive gear, a support rotatable concentric with the gear, a pinion on the support meshing with the gear and adapted for rotation relative to the axis of the pinion, the pinion being adapted for revolution around the axis of the drive gear by rotation of the support, a driven gear meshing with the pinion and rotatable concentric with the drive gear, an abutment for arresting rotation of the driven gear in one direction, means for holding the support stationary so as to prevent revolution of the pinion and thereby rotate the driven gear in the opposite direction by rotation of the pinion, and means actuated by said last mentioned rotation of the driven gear for releasing the holding means, the gearing frictionally holding the pinion against rotation relative to its axis when the holding means is released, whereby the driven gear is rotated in the first mentioned direction by revolution of the pinion until arrested by said abutment.

4. In combination, a drive gear, a support rotatable concentric with the gear, a pinion on the support meshing with the gear and adapted for rotation relative to the axis of the pinion, the pinion being adapted for revolution around the axis of the drive gear by rotation of the support, a sheave rotatable concentric with the drive gear and having a gear meshing with the pinion, means for releasably holding the support stationary so as to prevent revolution of the pinion and thereby rotate the sheave by rotation of the pinion, and means actuated by rotation of the sheave for releasing the holding means.

5. In combination, a drive gear, a support rotatable concentric with the gear, a pinion on the support meshing with the gear and adapted for rotation relative to the axis of the pinion, the pinion being adapted for revolution around the axis of the drive gear by rotation of the support, a sheave rotatable concentric with the drive gear and having a gear meshing with the pinion, means for releasably holding the support stationary so as to prevent revolution of the pinion and thereby rotate the sheave by rotation of the pinion and in the opposite direction to that of the drive gear, means for releasing the holding means, the gearing frictionally holding the pinion against rotation relative to its axis when the holding means is released, whereby the sheave is rotated in the same direction as that of the drive gear by revolution of the pinion, and an abutment adapted for engagement by the sheave for arresting its rotation after predetermined turning in said last mentioned direction.

6. In combination, a drive gear, a support rotatable concentric with the gear, a pinion on the support meshing with the gear and adapted for rotation relative to the axis of the pinion, the pinion being adapted for revolution around the axis of the drive gear by rotation of the support, an abutment for arresting rotation of the sheave in one direction, means for releasably holding the support stationary so as to prevent revolution of the pinion and thereby rotate the sheave in the opposite direction by rotation of the pinion, and means actuated by said last mentioned rotation of the sheave for releasing the holding means, the gearing frictionally holding the pinion against rotation relative to its axis when the holding means is released, whereby the sheave is rotated in the first mentioned direction by revolution of the pinion until arrested by said abutment.

7. In a tong operating device, a cathead spool having a longitudinally projecting sleeve and adapted for mounting on the line shaft of a draw works for rotation with the line shaft, a drive gear on the sleeve, a support rotatable on the sleeve, a pinion on the support meshing with the drive gear and adapted for rotation relative to the axis of the pinion, the pinion being adapted for revolution around the axis of the drive gear by rotation of the support, a sheave having an internal driven gear meshing with the pinion, the sheave being rotatable concentric with and lying in the transverse plane of the drive gear, a tong operating line adapted to be connected to the sheave to be wound thereon by rotation of the sheave, and means for releasably holding the support stationary so as to prevent revolution of the pinion and thereby rotate the sheave by rotation of the pinion.

8. In a tong operating device, a cathead having a longitudinally projecting sleeve and adapted for mounting on the line shaft of a draw works for rotation with the line shaft, a drive gear on the sleeve, a support rotatable on the sleeve, a pinion on the support meshing with the drive gear and adapted for rotation relative to the axis of the pinion, the pinion being adapted for revolution around the axis of the drive gear by rotation of the support, a sheave having an internal driven gear meshing with the pinion and rotatable concentric with the drive gear, a tong operating line adapted to be connected to the sheave to be wound thereon by rotation of the sheave, an abutment for arresting rotation of the sheave in one direction with the tong line unwound from the sheave, means for releasably holding the support stationary so as to prevent revolution of the pinion and thereby rotate the sheave in the opposite direction by rotation of the pinion so as to wind the tong line on the sheave, and means actuated by said last mentioned rotation of the sheave for releasing the holding means after predetermined rotation of the sheave, the gearing frictionally holding the pinion against rotation relative to its axis when the holding means is released, whereby the sheave is rotated in the first mentioned direction by revolution of the pinion until arrested by said abutment.

9. In combination, a drive gear, relatively rotatable elements comprising a support and a gear coaxial with and rotatable relative to the drive gear, a pinion journaled on the support and meshing with the gears, means for releasably holding one of the relatively rotatable elements against rotation for rotating the other of said relatively rotatable elements by the drive gear through the pinion, and means actuated responsive to rotation of said other of the relatively rotatable elements for releasing the holding means.

10. In combination, a driving element, a driven element, planetary gearing between said elements, releasable holding means for rendering the planetary gearing operative to rotate the driven element by the driving element, and means actuated responsive to rotation of the driven element for releasing the holding means.

11. In combination, a driving element, a sheave comprising a driven element, planetary gearing between said elements, releasable holding means for rendering the planetary gearing operative to rotate the sheave by the driving element, and means actuated responsive to rotation of the sheave for releasing the holding means.

12. In a tong operating device, a cathead spool having a longitudinally projecting sleeve and adapted for mounting on the line shaft of a draw works for rotation with the line shaft, a sheave encircling the sleeve coaxially therewith, planetary gearing between the sleeve and the sheave, releasably holding means for rendering the planetary gearing operative to rotate the sheave by the rotating sleeve, and means actuated responsive to rotation of the sheave for releasing the holding means.

WILLIAM C. WHALEY.